Patented Jan. 22, 1952

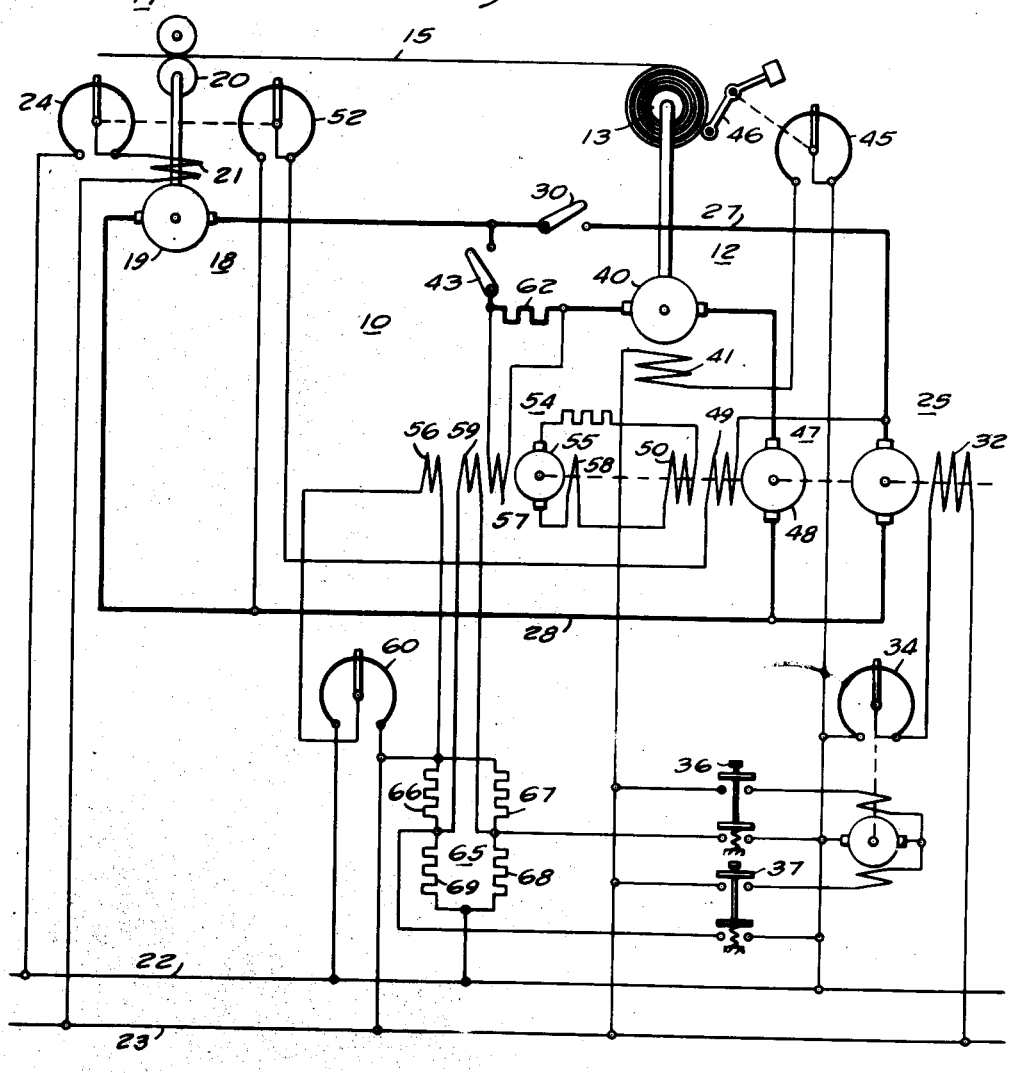

2,583,074

UNITED STATES PATENT OFFICE 2,583,074

MOTOR CONTROL SYSTEM

Eugene F. Alibert, Turtle Creek, and Basil J. Auburn, Forest Hills, Pa., assignors to Westinghouse Electric Corporation, East Pittsburgh, Pa., a corporation of Pennsylvania Application October 24, 1946, Serial No. 705,464

7 Claims. (Cl. 242—75)

1

Our invention relates generally to motor control systems, and it has reference in particular to regulating generator control systems for motors such as may be used in reel drives and the like.

Generally stated, it is an object of our invention to provide a control system for reel motors which is simple and inexpensive to manufacture, and which is reliable and efficient in operation.

More specifically, it is an object of our invention to provide for so controlling the operation of a reel motor as to regulate the tension of a strip of material which is in part wound on the reel, under both running and stalled operating conditions.

It is an important object of our invention to provide for regulating the value of the load or armature current of a reel motor with substantially constant or fixed field excitation under stalled operating conditions.

Another object of our invention is to provide for maintaining a predetermined value of armature current in a reel motor and in the armature of the driving motor of an adjacent roll stand of a rolling mill under stalled operating conditions, for maintaining a predetermined tension in a strip of material passing between the reel and roll stand.

Yet another object of our invention is to provide for using a booster generator for regulating the armature current of a reel motor under normal operating conditions, and for regulating the armature current of both the reel motor and the driving motor of a preceding or adjacent roll stand under stalled operating conditions.

We further propose to use a current regulating booster generator in connection with a reel motor for effecting energization of both the reel motor and the motor of the last or adjacent roll stand in order to produce a predetermined value of tension in a strip of material extending between the roll stand and the reel under stalled conditions.

It is also an important object of our invention to provide for connecting the armatures of a reel motor and of the drive motor of the last or adjacent roll stand in closed circuit relation with a booster generator, and for using a regulating generator which is responsive to the armature current of the reel motor for regulating the output voltage of the booster generator.

Another important object of our invention is to provide for controlling the operation of a reel motor by using a regulating generator which is operable over a wide range for regulating the

2 tension of a strip of material while the mill is running, and for operating the regulating generator over only a portion of its operating range for regulating the tension of the strip when the voltage of the mill bus is reduced to such an extent as to stall the mill.

Other objects will in part be obvious, and will in part be explained hereinafter.

In practicing our invention in one of its forms, the armatures of a reel motor and the drive motor of the last or an adjacent roll stand of a mill are energized from a common mill bus. A booster generator is connected in circuit relation between the armatures of the reel motor and of the mill motor for maintaining a predetermined tension in a strip by normally varying the voltage applied to the armature of the reel motor from the mill bus. The output voltage of the booster generator is controlled by a regulating generator which is responsive to the armature current of the reel motor. Under stalled conditions, when the voltage of the mill bus is reduced or removed, the booster generator provides the necessary voltage for maintaining the value of the armature currents of the reel and mill motors at a predetermined level for securing the desired tension in the strip. The field winding of the reel motor is energized from a source of control voltage which is varied in accordance with the diameter of the coil of the strip wound on the reel.

For a more complete understanding of the nature and scope of our invention, reference may be made to the following detailed description which may be studied in connection with the accompanying drawing, in which:

Figure 1 is a diagrammatic view of a reel control system embodying the invention in one of its forms, and Figure 2 shows curves illustrating the output characteristics of the regulating generator shown in the control system of Fig. 1 under running and stalled conditions.

Referring to Fig. 1 of the drawing, the reference numeral 10 may denote generally a control system for a reel motor 12 which may be connected in driving relation with a reel 13 for winding a strip of material 15 which may be worked on by a roll stand 17 which may, for example, be the last or an adjacent stand of a tandem mill.

The roll stand 17 may be provided with a driving motor 18 having an armature 19 and a field winding 21. The field winding 21 may be energized from a suitable source of control voltage represented by the control bus conductors 22 and 23, and a suitable rheostat 24 used to vary the energization thereof.

The armature 18 of the mill may or may not be connected to a suitable source of variable voltage such as a main generator 25, by main mill bus conductors 27 and 28. The generator 25 may be driven by any suitable prime mover (not shown). Control means represented by the switch 30 may be provided for disconnecting the armature of the mill motor 18 from the main generator 25. The output voltage of the main generator 25 may be controlled by connecting its field winding 32 to the control bus conductors 22 and 23 through a motor-driven rheostat 34 which may be selectively operated by means of "raise" and "lower" push-button switches 36 and 37, respectively.

The reel motor 12 may comprise an armature 40 and a field winding 41. The armature 40 may be connected between the mill bus conductors 27 and 28 by means of a control switch 43. The field winding 41 may be energized from the control bus conductors 22 and 23 through a field rheostat 45 which may be operatively connected to means such as the control arm 46 which engages the strip 15 on the reel 13. Accordingly, the field rheostat 45 may be adjusted automatically to vary the energization of the field winding 41 as the diameter of the coil on the reel 13 changes, so as to compensate for build-up of the coil. Any other suitable arrangement may be used for this purpose.

In order to provide for regulating the operation of the reel motor 12 to maintain a predetermined tension in the strip 15 between the roll stand 17 and the reel 13, means such as the booster generator 47 may be utilized. The booster generator 47 may comprise an armature 48, which may be driven by the prime mover of the main generator 25 and connected in series circuit relation with the armature 40 of the reel motor intermediate the armature 48 and the armature 20 of the mill motor 18. The booster generator may also be provided with main and regulating field windings 49 and 50, respectively.

The main field winding 49 may be connected to the main mill bus conductors 27 and 28 so as to be subjected to the same voltage as is applied to the armature of the mill motor 18. Means, such as the field rheostat 52, may be connected in circuit relation with the main field winding 49 for further varying the energization thereof. The field rheostat 52 may, for example, be operatively connected to the field rheostat 24 of the mill motor field winding 21 so as to provide for varying the output voltage of the booster generator in accordance with changes in the speed of the mill motor 18.

The regulating field winding 50 may be energized from a regulating generator 54 having an armature 55, a pattern field winding 56, a differential or control field winding 57, a self energizing field winding 58, and an inertia compensating field winding 59. The pattern field winding 56 may be energized from the control bus conductors 22 and 23 through a field rheostat 50 which serves to determine the operating level of the regulating generator. The control field winding 57 may be connected across a control resistor 62 in circuit relation with the armature 40 of the reel motor. The control field winding 57 opposes the pattern field winding 56 and neutralizes the magnetomotive force thereof when the armature current of the reel motor reaches the predetermined value for which the field rheostat 60 of the pattern field winding is set.

The self-energizing field winding 58 may be connected in circuit relation with the armature 55, while the inertia compensating field winding 59 may be connected to a bridge circuit 65 of resistors 66, 67, 68 and 69. The balance of the bridge circuit 65 is operatively controlled by the "raise" and "lower" push-button switches so as to make the field winding 59 cumulative with respect to the pattern field winding 56, when the voltage of the main generator 25 is being raised to accelerate the mill motor 18, and differential when the voltage of the main generator is being lowered to decelerate the mill motor. In this manner, it is possible to compensate for the inertia effects of the strip which is wound on the reel 13, and for the rotating parts of the reel drive.

In operation, the output voltage of the regulating generator 54 will be controlled by the voltage drop across the control resistor 62. Initially, the pattern field winding 56 is energized and the output voltage of the regulating generator is at a maximum value. When the armature current of the reel motor reaches the predetermined value necessary to maintain the desired tension in the strip 15, the magnetomotive force of the control field winding 57 opposes and effectively neutralizes the magnetomotive force of the pattern field winding 56. Accordingly, the output voltage of the regulating generator 54 tends to stay at the particular value occurring at the time.

Should the tension in the strip 15 increase, because of, for example, a hard spot in the strip which results in reduced reduction by the roll stand 17, and reduced strip speed, the reel motor 12 will momentarily slow down and its armature current increases. This increases the magnetomotive force of the control field winding 57, of the regulating generator 54, so that the voltage of the regulating generator will thereby be decreased or even reversed. This decreases the output voltage of the booster generator 47, and accordingly reduces the armature current of the reel motor 12, so as to restore the predetermined value.

As the diameter of the coil on the reel 13 gradually increases, the reel motor 12 gradually slows down. This tends to reduce the counterelectromotive force of the reel motor armature so that the armature current tends to increase. However, at the same time that the reel motor slows down because of the increasing diameter of the coil on the reel 13, the field rheostat 45 is operated to increase the energization of the reel motor field winding 41. This enables the reel motor to develop the same counterelectromotive force as before, but at the lower speed, and hence maintains the value of the armature current at the predetermined value. Accordingly, the output torque of the reel motor increases in accordance with the increase in the diameter of the coil so that the tension of the strip 15 is held at a substantially constant value.

The reel system may be operated under stalled conditions, either when the voltage of the main generator 25 is reduced sufficiently to stop the mill motor 18, or the control switch 30 is opened so as to disconnect the mill motor 18 and the reel motor 12 from the main generator 25.

Under these conditions, the energization of the main field winding 49 of the booster generator 47 is reduced to a relatively low or to a zero value.

but the energization of the regulating field winding 50 will still be controlled by the regulating generator 54. The regulating generator being responsive to the value of the armature current of the reel motor 12, energizes the regulating field winding 50 to maintain the predetermined value of armature current for which the tension rheostat 60 of the pattern field winding 56 is set. As the reel motor is not rotating, its counterelectromotive force is zero, and only a relatively small output voltage from the regulating generator is required to maintain the armature current of the reel motor at the value necessary to maintain normal tension in the strip. The field winding 41 of the reel motor 12 is energized at a substantially constant value from the control bus conductors 22 and 23, hence the torque of the reel motor will be directly proportional to the value of the armature current, which is effectively maintained by the regulating generator 54.

Since the armature 20 of the mill motor 18 is connected in series circuit relation with the armature 48 of the booster generator and the armature 40 of the reel motor, it will also be energized by the booster generator, and in such a direction as to pull against the reel motor thus insuring maintenance of the predetermined value of tension in the strip 15. Because the booster generator supplies electrical energy to both the reel motor 12 and the roll motor 18 to maintain the strip tension under stalled conditions, the regulating generator 54 need operate only along the positive portion of the saturation curve (a) of Fig. 2, whereas, when regulating under running conditions it operates on both the positive and negative sections of the saturation curve to both buck and boost the mill bus voltage.

From the above description and the accompanying drawing, it will be apparent that we have provided a simple and effective control system for reel motors by utilizing a booster generator for controlling the value of the reel motor armature current when the mill is running and for regulating the value of the armature current of both the reel motor and the mill motor when the mill is stopped. Complete control of strip tension is thus obtained under running and stalled conditions.

While our invention has been described in detail in connection with a winding reel, it will be realized that it is equally applicable to unwinding or payoff reels. The winding system shown may be converted to an unwinding system merely by reversing the polarity of the main bus conductors 27 and 28, and reversing the connections of the inertia compensating field winding 59 in the bridge circuit 65. This compensates for the fact that the reel motor functions as a generator in the payoff system, instead of as a motor.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. A control system comprising, a motor disposed to be connected in driving relation with a work device for working on a strip of material, a reel motor having an armature connected in driving relation with a reel for winding the strip and having a field winding connected for energization in accordance with the diameter of a coil of strip material on the reel, circuit means connecting the armatures in parallel circuit relation to a principal source of electrical energy, and circuit means including a booster generator connected in series circuit relation with the reel motor armature and the source and in closed circuit relation with said armatures, and a regulating generator disposed to be responsive to the armature current of the reel motor connected to vary the field excitation of the booster generator for supplying a variable voltage to the reel motor armature to maintain a predetermined value of current through the reel motor armature whether the principal source is supplying a normal operating voltage to the armature or whether the voltage of the principal source is reduced to stall the reel motor.

2. In a control system, a mill motor having a field winding connected to a source of electrical energy and having an armature, a reel motor having an armature and a field winding connected to a source of electrical energy, circuit means connecting said armatures to a variable voltage source of electrical energy, a booster generator connected in circuit relation with the armatures of the mill and reel motors, and regulating means responsive to the armature current of the reel motor operable to vary the output of the booster generator to maintain a predetermined value of reel motor armature current normally and to effect reverse energization of the mill motor armature to maintain tension in the strip when the voltage of the variable voltage source is reduced below a predetermined value.

3. A reel control system for use with a roll stand driven by a mill motor having an armature energized from a source of variable voltage and a field winding energized from a source of electrical energy comprising, a reel motor having an armature operatively connected to the reel and a field winding disposed to be energized in accordance with the diameter of a coil of strip material on the reel, circuit means connecting the reel motor armature to the source of variable voltage power in parallel circuit relation with the mill motor armature, switch means operable to disconnect the mill motor and reel motor armatures from the variable voltage source, and means including a generator connected in circuit relation with the mill motor and reel motor armatures, said generator being responsive to the armature current of the reel motor to maintain a predetermined value of reel motor armature current whether the reel motor and mill motor armatures are connected to the variable voltage source or not.

4. In a control system for a reel motor having an armature and a field winding energized in accordance with the diameter of a coil of material on a reel, a booster generator having a field winding and an armature disposed to be connected in circuit relation with the reel motor armature and a source of variable voltage, and a regulating generator having an armature and a self-energizing field winding connected in circuit relation with the booster generator field winding, said regulating generator having opposed balanceable pattern and control field windings energized respectively from a source of control voltage and from a source of voltage variable in accordance with the value of the reel motor armature current.

5. In a control system, a mill motor connected in driving relation with a roll stand and having an armature connected to a source of variable voltage and a field winding energized from a source of control voltage, a reel motor connected in driving relation with a reel for handling material being worked on by the roll stand, said reel motor having an armature connected to the variable voltage power source and a field winding energized in accordance with the diameter of the coil of material on the reel, a booster generator having an armature connected in circuit relation between the armatures of the reel and mill motors, said booster generator having a field winding energized from the source of variable voltage and a regulating field winding, and a regulating generator responsive to the armature current of the reel motor connected to energize the regulating field winding.

6. A reel control system for use with a mill motor having an armature energized from a variable voltage power source and a field winding provided with a rheostat connecting it to a source of control voltage comprising, a reel motor connected in driving relation with a reel and having an armature connected in parallel circuit relation with the mill motor armature, a booster generator for varying the voltage applied to the reel motor armature having an armature connected in circuit relation with the armatures of the mill and reel motors and provided with a plurality of field windings, circuit means connecting one of said field windings to the source of control voltage including a rheostat operatively connected to the field rheostat of the mill motor, and a regulating generator connected to energize another of said field windings, said regulating generator being responsive to the armature current of the reel motor.

7. The combination with a motor energizeable from a variable voltage source to drive a device for handling an elongated piece of material, of a reel motor, a booster generator connected in circuit relation with the reel motor and the first-mentioned motor, and a regulating generator having field excitation means energized in accordance with the armature current of the reel motor responsive to an electrical characteristic of the reel motor connected to supply field excitation to the booster generator and regulate the output of the booster generator to maintain a predetermined value of motor armature current during operating and stalled conditions.

EUGENE F. ALLBERT.
BASIL J. AUBURN.

REFERENCES CITED

The following references are of record in the file of this patent:

UNITED STATES PATENTS

| Number | Name | Date |
|---|---|---|
| 2,043,208 | Bohn | June 2, 1936 |
| 2,168,777 | McCreary | Aug. 8, 1939 |
| 2,305,937 | Montgomery et al. | Dec. 22, 1942 |
| 2,306,157 | Edwards et al. | Dec. 22, 1942 |
| 2,315,869 | Montgomery | Apr. 6, 1943 |
| 2,333,978 | Bowman | Nov. 9, 1943 |